Aug. 27, 1929.　　　　M. B. WOOD　　　　1,726,204
TRUCK TYPE SWITCHBOARD AND INTERLOCKING MECHANISM
FOR THE SWITCHES THEREOF
Filed May 19, 1927　　　3 Sheets-Sheet 1

Inventor,
Morris B. Wood

Aug. 27, 1929.  M. B. WOOD  1,726,204
TRUCK TYPE SWITCHBOARD AND INTERLOCKING MECHANISM
FOR THE SWITCHES THEREOF
Filed May 19, 1927   3 Sheets-Sheet 2
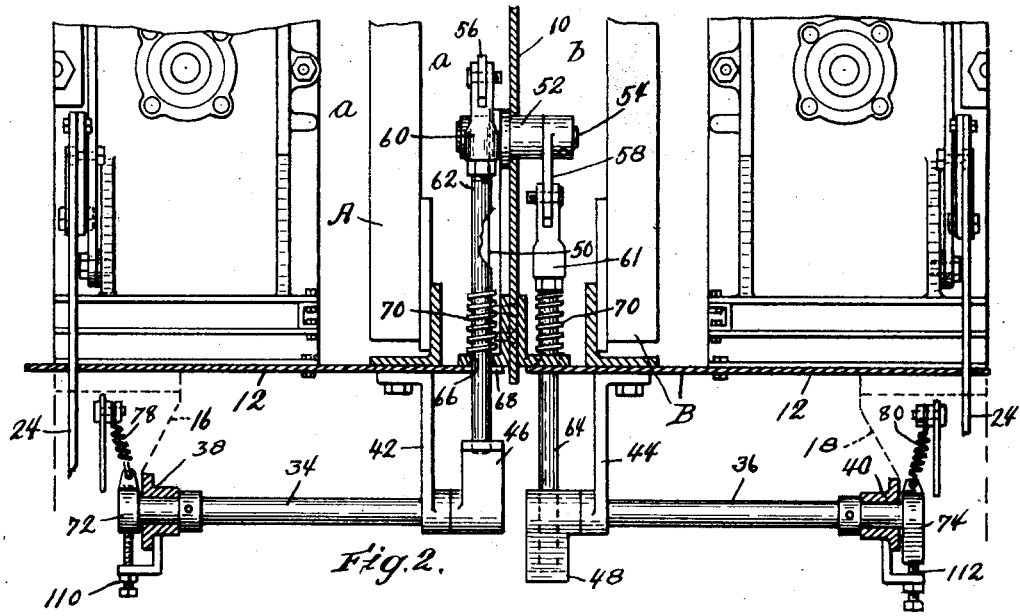
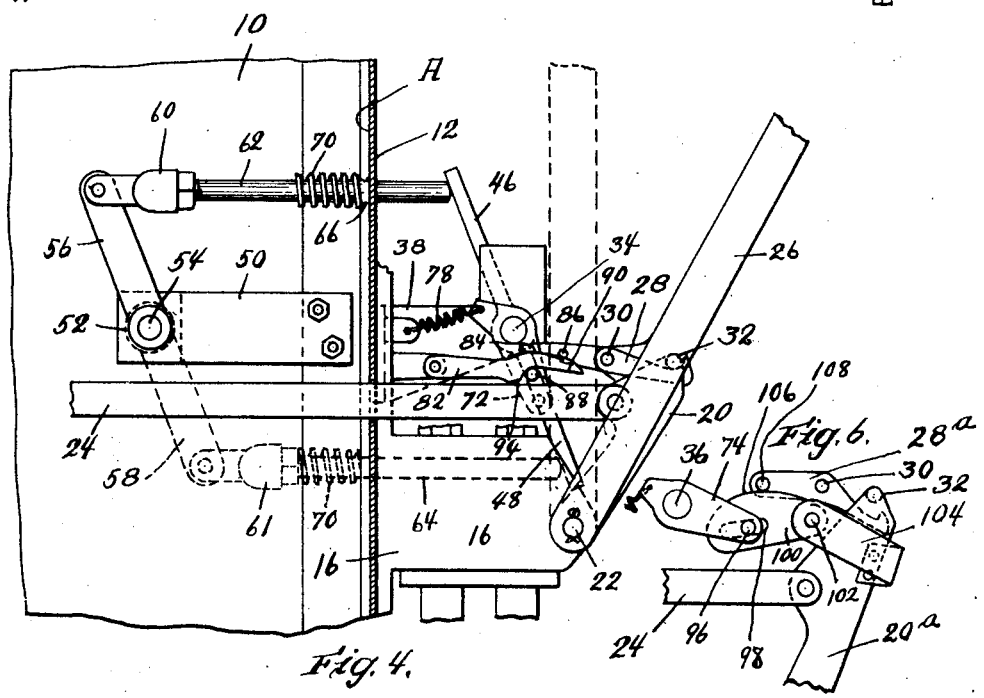
Inventor,
Morris B. Wood Aug. 27, 1929.   M. B. WOOD   1,726,204
TRUCK TYPE SWITCHBOARD AND INTERLOCKING MECHANISM
FOR THE SWITCHES THEREOF
Filed May 19, 1927   3 Sheets-Sheet 3
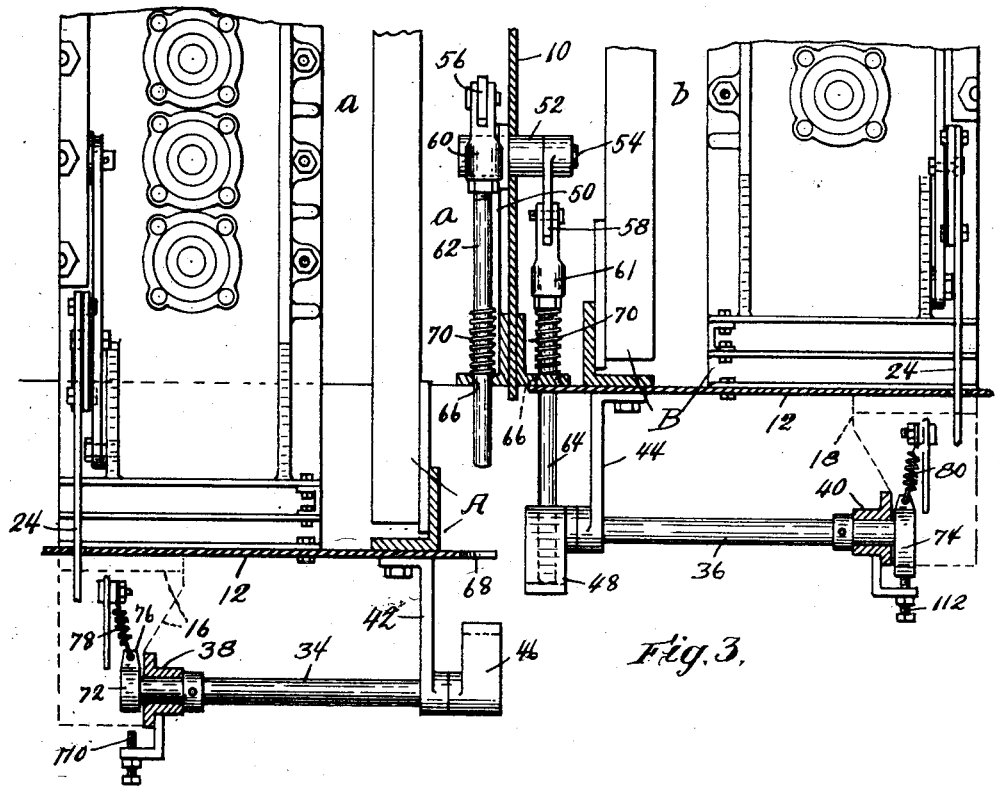
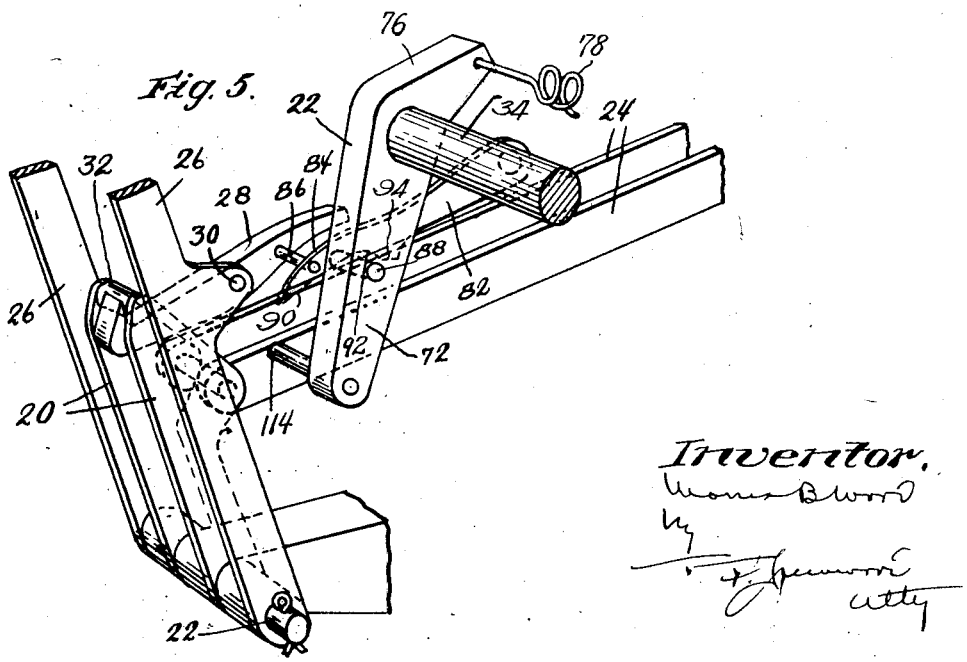

Patented Aug. 27, 1929.

1,726,204

UNITED STATES PATENT OFFICE.

MORRIS B. WOOD, OF SOMERVILLE, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS.

TRUCK TYPE SWITCHBOARD AND INTERLOCKING MECHANISM FOR THE SWITCHES THEREOF.

Application filed May 19, 1927. Serial No. 192,719.

This invention relates to truck type switchboards and to the interlocking of switches of adjacent switchboards; and has for an object the provision of interlocking mechanism connecting the switches of two adjacent truck type switchboards so arranged that either switchboard can be pulled out of its compartment without the necessity for first disconnecting the interlocking mechanism extended between the switches.

A further object of the invention is the provision of interlocking mechanism for the adjacent switches of truck type switchboards characterized by having a section carried by each switchboard with means so arranged that the sections are automatically disconnected and reconnected when the trucks are moved out of and into working position.

A further object is generally to improve the construction and operation of truck type switchboards and interlocking mechanisms for the switches thereof.

Fig. 2 is a sectional detail taken just above the interlocking shaft of the switches and illustrating the construction of the mechanism connecting the shaft sections.

Figure 1:
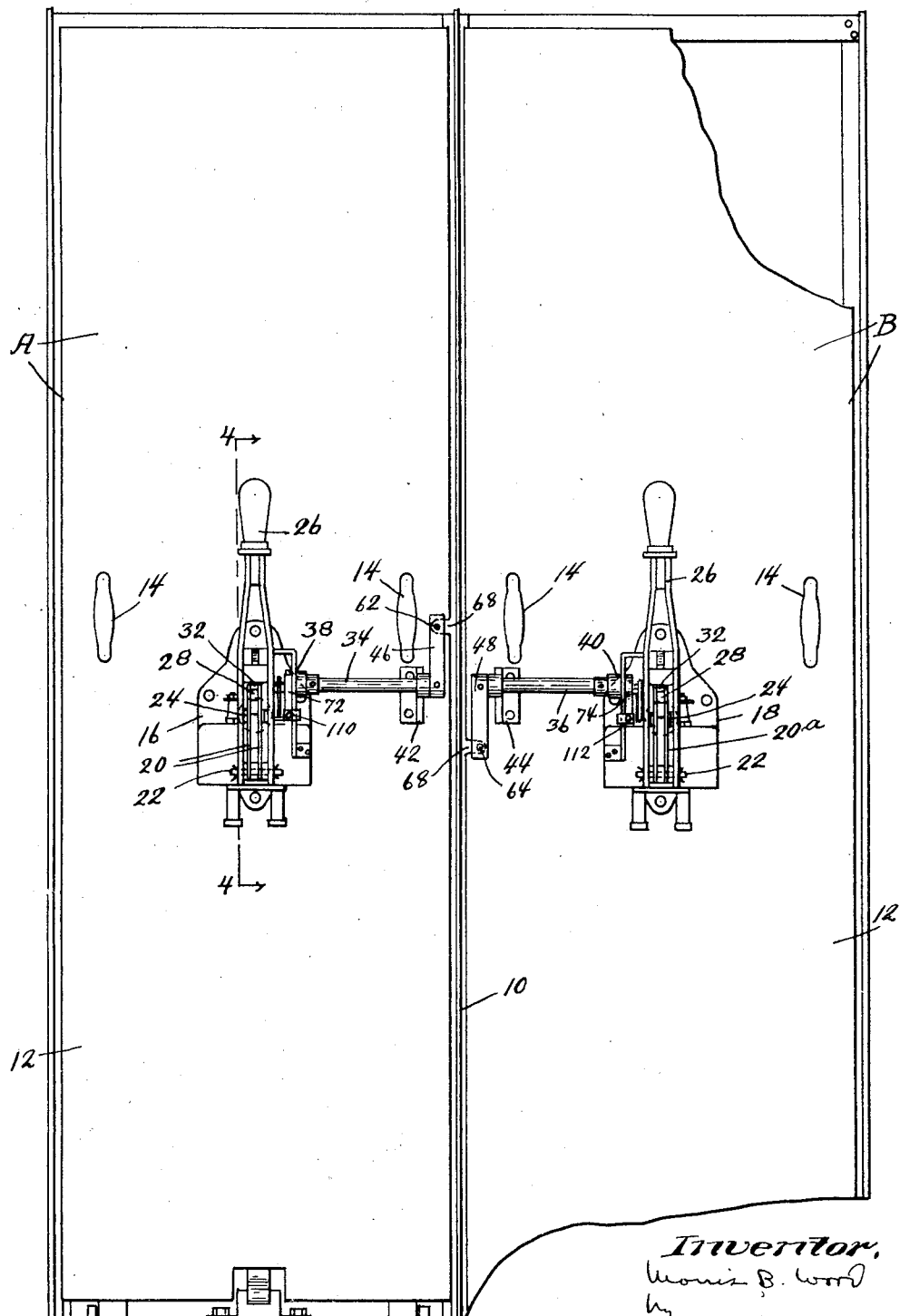
Fig. 1 is a front elevation of a pair of truck type switchboards embodying the invention.

Fig. 3 is a view similar to Fig. 2 but illustrating one of the switchboards in a partially withdrawn position.

Fig. 4 is a sectional detail taken along line 4—4 of Fig. 1.

Fig. 5 is a perspective detail of the switch mechanism carried by the face plate of the left hand switch.

Fig. 6 is a detail showing the arrangement of the interlocking mechanism at the right hand switch.

The invention is here shown as applied to two truck type switchboards having removable trucks A and B contained in a cell structure, the cells of which are isolated from each other by a vertical plate or partition wall 10. Each truck has a front panel 12 which forms a closure for the cell and handles 14 by which the truck can be pulled out of or rolled into its cell. Each truck carries a switch which is operated by mechanism carried by face plates 16 and 18 exteriorly supported on the front faces of the panels. Each face plate has an upstanding arm 20 pivotally mounted on the pin 22 and a rod 24 which is pivoted to said arm and extends rearwardly through an aperture in the panel to the switch in the rear of said panel. An operating handle 26 straddles said arm 20 and is pivoted concentrically therewith on the pin 22 and has a latch 28 pivoted at 30 thereto, which latch is adapted releasably to engage a latch pin or roller 32 carried by the upper end of said arm 20. Normally, the latch is in engagement with said arm, by which the switch handle and the arms are operatively connected to permit the closing of the switch. The latch is adapted to be disengaged from the arm either upon overload or through the action of the interlocking mechanism hereinafter to be described thereby to disconnect the handle from the arm and to permit the switch to open independently of the handle, or prevent the handle from gaining control of the switch mechanism. The handle is adapted to be locked in switch closed position to the face plate by means not shown, thereby also to lock the switch in switch closed condition.

The interlocking mechanism comprises two aligned shafts 34 and 36 respectively which are carried by the front faces of the panels of the switchboards and are journalled in brackets 38 and 40 at the face plates 16 and 18 and in brackets 42 and 44 adjacent the proximate edges of the panels. Said shafts 34 and 36 are adapted to rotate in unison under control of either switch.

In accordance with this invention means are provided to couple the shafts for conjoint rotation when the trucks of both switchboards are in place, said means being characterized by automatically disconnecting and reconnecting the shafts when either truck is moved out of or rolled into its cell without the necessity for breaking and making special connections between the shafts. To this end, the free end of the shaft 34 has an upstanding arm 46 fixed thereto and the free end of the shaft 36 has a depending arm 48 fixed thereto, the arms being extended in practically a straight line in opposite directions. The partition wall 10 between the cells is provided with mechanism connecting said shafts through said arms. Said mechanism includes a bracket 50 which is secured to the partition wall and has a hub 52 extended through the wall. A shaft 54 is journalled in said hub and has an upstanding arm 56 fixed thereto within the left hand cell $a$. A similar but depending arm 58 is fixed to the other end of said shaft in the right hand cell $b$. Said arms 56 and 58 are extended in opposite directions in substantially the same line and are adapted at all times to be approximately parallel to the arms 46 and 48 of the shafts. Yokes 60 and 61 are pivoted to said arms 56 and 58 respectively and pins 62 and 64 are adjustably screw-threaded in said yokes and extend in parallel relation forwardly through guide members 66 carried by the front edge of the partition wall 10 and through apertures 68 in the truck panels 12 and into bearing engagement with the ends of the arms 46 and 48 of the interlocking shafts. Helical springs 70 are loosely disposed on said pins 62 and 64 between the yokes and the guide members 66 and are adapted to engage the yokes and limit the free travel of the pins when one or the other is withdrawn. The shafts 34 and 36 are provided with means hereinafter to be described to maintain the arms 46 and 48 continuously in engagement with the pins 62 and 64. With the arrangement shown, rotation of the shaft 34 in a counterclockwise direction, Fig. 4, serves to rotate the shaft 54 in a counterclockwise direction and thus cause the pin 64 to be moved outwardly and rotate the shaft 36 in a counterclockwise direction, thus effecting the conjoint rotation of both shafts in the same direction. Operation of the shaft 36 effects the control of the shaft 34 in the same manner. The arms 46 and 48 of the interlocking shafts 34 and 36 are free from positive connection with the pins 62 and 64. As thus arranged, either truck can be withdrawn from its position within the cell and the connection between the shafts is automatically broken.

In Fig. 3, the left hand switch A is illustrated in a partially withdrawn position wherein the pin 62 is free from engagement with the arm 46. The ends of the shafts 34 and 36 located at the face plates have depending arms 72 and 74 respectively fixed thereto which arms are adapted to control the tripping latches of the face plates 16 and 18. Said arm 72 is provided with an upstanding ear 76 and a tension spring 78 is connected between said ear and the face plate and serves to urge said shaft 34 for rotation in a counterclockwise direction and maintain the arm 46 in engagement with the pin 62. The arm 74 of the shaft 36 has a similar tensile spring 80 connected therewith which tends to rotate the shaft 36 in a clockwise direction and maintains the arm 48 in engagement with the pin 64. The tripping latch 28 of the left hand switch is under control of said arm 72 through a lever 82 pivoted to the face plate which has an upper arcuate cam face 84 that when in elevated position is adapted to engage a laterally extended pin 86 carried by the tripping latch 28 and trip the latch and permit the switch to trip open. Movements of the lever 82 are controlled by the arm 72 which has a laterally extended pin 88 disposed beneath the lever 82 and adapted normally to engage the approximately horizontal cam face 90 of said lever. In the position of the parts shown in Fig. 4, the switch can be closed without tripping of the latch 28. The arm 72 is permitted a small amount of movement in a clockwise direction without raising the lever 82. When, however, the arm is rotated sufficiently in a clockwise direction by the operation of the right hand switch, the pin 88 is brought into engagement with the downwardly inclined cam face 90 of said lever and thus raises the lever and causes the disengagement of the tripping latch 28 with the switch lever 20, thus preventing the switch from moving into completely closed position. The lever 82 is provided with a lower face 94 which is adapted to be engaged by the pin 88 to hold the lever 82 in full elevated position.

The arm 74 of the right hand switch, see Fig. 6, is provided with a laterally extended pin 96 which is received within a slot 98 of a link 100 pivoted at 102 to an arm 104 fixed to the switch lever 20$^a$ of the right hand switch. Said link 100 is provided with an upper arcuate cam face 106 which, under certain conditions, is adapted to engage a laterally extended pin 108 of the tripping latch 28 of the right hand switch and hold it in disengaged position, thereby to prevent the closing of the right hand switch. Both arms 72 and 74 are provided with adjustable stop members 110 and 112 respectively which are adapted to restrict the movement of said arms in a counterclockwise direction. The setting of said stop members determines or not the interlocking mechanism is selective.

When the interlocking mechanism is so adjusted that it is not selective then either switch can be closed at will and will prevent the closing of the other switch until the first has been again opened. When the mechanism is adjusted to be selective, the left hand switch must be closed first and the right hand switch can not be closed without tripping out the left hand switch.

When the interlocking mechanism is not selective, the left hand switch can be closed without effecting control of the interlocking shafts and, in the normal position of the mechanism, the link 100 of the right hand switch is below the position illustrated in Fig. 6 so that the latch 28ª is in engagement with the switch lever 20ª and permits the switch to close. During the closing movement of the right hand switch, however, the bottom of the slots 98 engages the pin 96 of the arm 74 and causes the rotation of the interlocking shaft 36 in a clockwise direction, thereby rotating the shaft 34 through the shaft interconnecting mechanism in the same direction and raising the lever 82 and thereby tripping out the left hand switch.

When the interlocking mechanism is set for selective operation the stop members 110 and 112 respectively are backed off to an extent sufficient to permit the lower end of the arm 72 to be advanced outwardly away from the face plate by a small amount and the arm 74 to hold the link 100 in the elevated position shown in Fig. 6 wherein the latch 28ª is held in a trip free position. As thus arranged, the right hand switch can not be closed. The left hand switch can be closed, however, but during the final part of the closing movement one of the bars 26 of the handle is moved into engagement with the laterally extended pin 114 of the arm 72, thus rotating the arm in a clockwise direction, Fig. 4, and causing the arm 74 of the right hand switch to be moved into a position where the right hand switch can be closed. When the right hand switch is in the latter part of its closing movement, the bottom of the slot 98 engages the pin 96 of the arm 74 and causes the interlocking shaft to rotate in a clockwise direction and thus causes the arm 72 to raise the lever 82 and trip out the left hand switch.

The specific type of switch interlocking mechanism herein shown in connection with this invention is illustrated generally in the Chester D. Ainsworth Patent No. 1,596,513, dated August 17, 1926.

I claim:

1. The combination with a pair of truck type switchboards each having switch operating mechanism and means for holding said mechanism in switch closed position, of interlocking mechanism for controlling said holding means associated with said switch mechanisms having arranged to prevent both switches from being closed at the same time and interconnecting mechanism characterized by being automatically connected and disconnected by the moving of a truck out of and into operative position.

2. The combination with a pair of truck type switchboards each having switch operating mechanism and a latch to hold the switch mechanism in closed position, of interlocking mechanism for the latches of said switch mechanisms and connecting means for the interlocking mechanism arranged to prevent both switches from being closed at the same time and having components adapted to be automatically connected and disconnected by movements of the trucks into and out of operative position.

3. The combination with a pair of truck type switchboards each having a switch operating mechanism and a holding latch therefor, of interlocking mechanism controlling the operation of the latches of said switch mechanisms including control mechanism common to both trucks, and connecting mechanism in said control mechanism characterized by being connected and disconnected upon movements of either truck into and out of operative position.

4. The combination with a pair of truck type switchboards each having a switch operating mechanism, a cell structure in which said switch boards are normally received having a partition wall between the trucks, and interlocking mechanism common to both trucks having an intermediate component thereof carried by said partition wall.

5. The combination with a pair of truck type switchboards each having a switch operating mechanism, a cell structure in which said switch boards are normally received having a partition wall between the trucks, and interlocking mechanism for said switch mechanisms having components carried by both trucks and connecting means for said components carried by said partition wall.

6. The combination with a pair of truck type switchboards each having a switch operating mechanism, a cell structure in which said switchboards are normally received having a partition wall between the trucks, and interlocking mechanism for said switch mechanisms having components carried by both trucks and connecting means for said components carried by said partition wall, said components characterized by being free from positive connection with said connecting means.

7. The combination of a pair of truck type switchboards each having switch operating mechanism and a latch for holding said mechanism in closed position, interlocking means having disconnectible components for controlling the latches of said switch mechanisms including a pair of interlocking shafts each carried by a truck, and an independently supported connecting mechanism for said shafts characterized by being automatically connected therewith and disconnected therefrom by movements of either truck into and out of operative position.

8. The combination of a pair of truck type switchboards each having a switch operating mechanism, a cell structure in which said switch boards are normally received having a partition wall between the switchboards, interlocking mechanism connecting said switch mechanisms including interlocking shafts carried by each board, and connecting mechanisms for said shaft carried by said partition wall.

9. The combination of a pair of truck type switchboards each having an operating mechanism, a cell structure in which said switchboards are normally received having a partition wall between the switchboards, interlocking mechanisms connecting said switch mechanisms including interlocking shafts carried by each board, and connecting mechanism for said shafts carried by said partition wall, said connecting mechanism characterized by being free from positive connection with said shafts and by being connected therewith and disconnected therefrom by movements of said trucks into and out of said cell structure.

10. The combination of a pair of truck type switchboards each having a switch operating mechanism, interlocking mechanisms for said switch mechanism including a pair of parallel interlocking shafts carried by said switchboards, and stationarily supported lever mechanism interconnecting said shafts to rotate them conjointly, said lever mechanism characterized by being free from positive connection with said shafts.

11. The combination of a pair of truck type switchboards each having a switch operating mechanism, interlocking mechanisms for the switch mechanisms including a pair of parallel interlocking shafts carried by said switchboards having oppositely extended arms at their proximate ends, and stationarily supported lever mechanism connecting said arms and characterized by being free from positive connection therewith.

12. The combination of a pair of truck type switchboards each having a switch operating mechanism, of interlocking mechanisms for the switch mechanisms including a pair of parallel interlocking shafts carried by said switch boards having oppositely extended arms at their proximate ends, stationarily supported lever mechanism connecting said shafts including a lever having a stationarily supported pivotal support intermediate its ends, and pins connected with the ends of said lever having bearings on the arms of said shafts.

13. The combination of a pair of truck type switchboards each having a switch operating mechanism, a cell structure in which said switchboards are normally received having a partition wall between the switchboards, interlocking mechanism connecting said switch mechanisms including a pair of parallel interlocking shafts carried by said switchboards having oppositely extended arms at their proximate ends, and connecting mechanism for said shafts including a lever pivoted intermediate its ends to partition wall, and pins carried by the ends of said lever having bearings on the arms of said interlocking shafts.

14. The combination of a pair of truck type switchboards each including a vertical panel and switch operating mechanism mounted on the panels, a cell structure in which said switchboards are normally received having a partition wall disposed between said switchboards, interlocking mechanisms for said switch mechanisms including a pair of interlocking shafts carried by the front face of said panels having oppositely directed arms at their proximate ends, and connecting mechanism for said shafts including a lever disposed in parallel relation with said arms and pivoted intermediate its ends to its partition wall, and horizontally extended pins connected with the ends of said lever and movable through said panels and having bearings on the arms of said shafts.

15. The combination of a pair of truck type switchboards each having an operating mechanism, a cell structure in which said switchboards are normally received having a partition wall between the switchboards, interlocking mechanism for said switch mechanisms including a pair of aligned interlocking shafts carried by said switchboards, said shafts having oppositely directed arms at their opposite ends and connecting mechanism for said shafts including a stationarily-supported shaft extended through said partition wall and horizontally disposed pins connected with the ends of the arms of said connecting mechanism and having bearings on and being free from positive connection with said shaft arms.

16. The combination of a pair of truck-type switches each having a switch operating mechanism, a fixed support, and interlocking mechanism for said switch mechanisms having components carried by both truck-type switches, and connecting means for said components carried by said fixed support.

In testimony whereof, I have signed my name to this specification.

MORRIS B. WOOD.